United States Patent [19]

Min

[11] Patent Number: 5,285,277
[45] Date of Patent: Feb. 8, 1994

[54] IMPULSE NOISE REDUCTION METHOD AND CIRCUIT

[75] Inventor: Byong-Min Min, Seoul, Rep. of Korea

[73] Assignee: Samsung Electronics Co., Ltd., Kyunggi, Rep. of Korea

[21] Appl. No.: 892,130

[22] Filed: Jun. 2, 1992

[30] Foreign Application Priority Data

Jun. 3, 1991 [KR] Rep. of Korea ............ 91-9169

[51] Int. Cl.$^5$ .............................. H04N 5/213
[52] U.S. Cl. ............................ 348/607; 358/340
[58] Field of Search ............... 358/167, 36, 166, 37, 358/21 R, 160, 31, 162, 336, 340; H04N 5/213

[56] References Cited

U.S. PATENT DOCUMENTS

| | | | |
|---|---|---|---|
| 4,398,210 | 8/1983 | Liu et al. | 358/167 X |
| 4,885,639 | 12/1989 | Nakata et al. | 358/167 |
| 4,918,528 | 4/1990 | Oohashi | 358/162 |
| 4,984,068 | 1/1991 | Sugiyama et al. | 358/105 X |

*Primary Examiner*—Victor R. Kostak
*Attorney, Agent, or Firm*—Sughrue, Mion, Zinn, Macpeak & Seas

[57] ABSTRACT

An image signal processing system such as a television, a video tape recorder, a video disk player, a digital camera and the like, more particularly to an impulse noise reduction method and circuit which can reduce impulse noise component effectively in the image signal without damage of the original input image signal by using the noise characteristic in which has no vertical correlation and of which frequency component has 2 MHz or more in a horizontal direction at least.

13 Claims, 6 Drawing Sheets

IMPULSE NOISE REDUCTION METHOD AND CIRCUIT

BACKGROUND OF THE INVENTION

1. Field of the Invention

The present invention relates to an image signal processing system such as a television, a video tape recorder, a video disk player, a digital camera and the like, more particularly, to impulse noise reduction method and circuit which can reduce impulse noise component in the image signal without a damage of the original input image signal.

2. Description of the Prior Art

In such an image signal processing system, for example, a television, a video tape recorder and the like, one of the important problems is to reproduce a clean picture image without noise components and/or other artifacts.

Generally, the picture image provided from broadcasting stations or tape manufacturers, is likely to be mixed with noise due to an image transmitting channel or a repeated copy therefor and further mixed with unnecessary noise depending upon a performance of the iamge signal processing system.

Such that noise is intended to be occurred when an image source originally contains the noise component or a poor film is employed in the image signal processing system. Moreover, the picture image is mixed with the noise in case that a recording is effected under a bad light effect and also the image is affected by a weak electric field during the reception of television image signal.

The noise component is generally divided into impulse noise and line noise and the impulse noise is further divided into white noise and black noise. These noise components may be simultaneously cantained in the image signal. Accordingly, various counterplans must be considered in order to reduce the noise components effectively. Because of that, various technical methods have been developed to reduce the noise component. However, the original image signal is likely to be affected by such the methods.

More particurlary, an examplary one of the methods has been proposed in, for example, U.S Pat. No. 4,926,261 (VIDEO NOISE REDUCTION CIRCUIT) issued on May 15, 1990. With this patent method, a high-pass component is filtered from a brightness signal of the image signal so that the signal is defined and controlled in level to obtain a noise suppressing signal and a low noise output is then obtained by subtracting the noise suppressing signal from the input image signal.

Referring to FIG. 1, there is shown a conventional noise reduction circuit, but similar to that of the patent publication. In the drawing, the brightness signal A shown in FIG. 2 (A), is entered to an input terminal IN in FIG. 1. The input brightness signal A is divided into high-frequency and low-frequency components by means of a low-pass filter (LPF) 2 and a high-pass filter (HPE) 4, as shown in FIGS. 2 (B) and (C). Subsequently, the low-frequency component B from the LPF 2 is amplified by a first amplifier 6 and then entered into an input terminal of an adder 12 while the high-frequency component C from the HPF 4 is input to a coring portion 8 which removes the noise component below a coring level T so as to output a higher signal D than the coring level T, as shown in FIG. 2(D). The output D of the coring portion 8 is amplified by means of a second amplifier 10 and the amplified signal is then entered into the adder 12, as shown in FIG. 2(E). The adder 12 adds the output signals from the first and second amplifiers 6 and 10, and outputs at an output terminal OUT the noise-reduced brightness signal F as is shown in FIG. 2 (F).

With the conventional circuit constructed as mentioned above, however, a detail signal having relatively higher frequency component of the picture image is also removed together with the high frequency noise component, resulting in a problem that the picture image is in a soft condition. That is, in case that pulses of a transition period of the high-frequency image signal shown in FIG. 3 (A) are subjected to process, it is a problem that the image signal is changed into a low-frequency component as shown in FIG. 3 (B), to be thereby outputted a soft picture image.

SUMMARY OF THE INVENTION

Accordingly, a principal object of the present invention is to provide impulse noise reduction method and circuit which can obtain a distinct image signal by reducing impulse noise component without a damage of an original input image signal.

In order to acheive the object, the present invention provides an impulse noise reduction method comprising : (a) vertical line delay step for delaying an input brightness signal in a unit of line; (b) vertical correlation determination step for determining impulse noise on the basis of a vertical correlation between the 1 horizonal line(1H)-delayed line at the step (a) and upper and lower horizontal lines; (c) noise signal detection step for detecting the impulse noise from the 1H-delayed signal at the step (a) and outputting a noise detection signal; (d) correction signal produce step for producing a correction signal by using upper and lower horizontal lines upwardly and downwardly positioned with respect to the impulse noise-detected line and, (e) output step for outputting the correction signal produced at the correction signal produce step (d) when the impulse noise is detected at the step(c).

Also, the present invention provides an impulse noise reduction circuit comprising; a horizontal line delay means for delaying an input brightness signal in a unit of line; a vertical correlation detection means for detecting a vertical correlation between the 1H-delayed brightness signal from the hoizontal line delay means and the brightness signals of upper and lower lines; an impulse noise detection means for detecting a vertical correlation of the 1H-delayed brightness signal from the horizontal line delay means and detecting the impulse noise ; a logic means for outputting a noise detection signal when the impulse noise is detected without the vertical correlation by means of the vertical correlation detection means and the impulse noise detection means; a signal delay means for delaying the brightness signal for a predetermined time to process the signal a correction signal produce means for adding the present input brightness signal delayed by a predetermined time by means of the signal delay means and the 2H-delayed brightness signal and averaging them to produce a corrected brightness signal ; and, an outputting means for selectively outputting the correction signal produced from the correction signal produce means or the 1H-delayed brightness signal from the horizontal line delay means on the basis of the the detection signal outputted from the logic means.

The above and other objects, features and advantages will be apparent from the following description made in consideration with the accompanying drawings.

DETAILED DESCRIPTION OF THE PREFERRED EMBODIMENT

Thereinafter, a preferred embodiment of the present invention will be described with reference to the accompanying drawings.

Firstly, an impulse noise reduction method according to the present comprises the steps of : (a) vertical line delay step for delaying an input brightness signal in a unit of line; (b) vertical correlation determination step for determining impulse noise on the basis of a vertical correlation between the 1 horizontal line(1H)-delayed line at the step (a) and upper and lower horizontal lines; (c) noise signal detection step for detecting the impulse noise from the 1H-delayed signal at the step (a) and outputting a noise detection signal; (d) correction signal produce step for producing a correction signal by using upper and lower horizontal lines upwardly and downwardly positioned with respect to the impulse noise-detected line; and, (e) output step for outputting the correction signal produced at the correction signal produce step (d) when the impulse noise is detected at the step(c).

In an aspect of the present invention, the vertical correlation detection step, that is, the step (b) comprises the steps of : obtaining a difference between upper and lower lines on the basis of the 1H-delayed line and comparing the difference with a reference value to detect a correlation between the vertical lines; determining the impulse noise by using the defference between the upper and lower lines on the basis of the 1H-delayed line; and, outputting a noise detection signal when the impulse noise is determined without the correlation between the vertical lines at the step of detecting the vertical line correlation and the step of detecting the impulse noise.

Also, the noise signal detection step (c) further includes the steps of: differentiating the 1H-delayed brightness signals; integrating the differentiated brightness signal; and, obtaining an absolute value of the intrgreated brightness signals and comparing the absolute value with a reference value to output a noise detection signal when the noise is detected from the comparison result.

The correction signal produce step (d) comprises the steps of: delaying the present input brightness signal and the 1H-delayed brightness signal by a predetermined time; and, obtaining an average value of the signals delayed at the step of delaying the signals and outputting the average value as a correction signal.

Moreover, at the correction signal output step (e), if the impulse noise is detected, the correction signal is produced from the average value between the upper and lower lines. Alternatively, if no the impulse noise is detected, the 1H-delayed original brightness signal is delayed by a predetermined time for processing the signal and then outputted.

Figure 1:
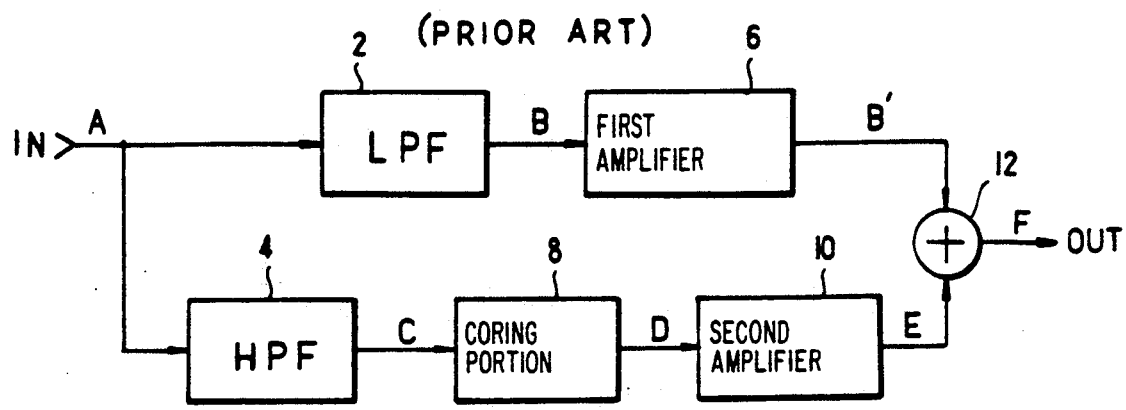
FIG. 1 is a circuit diagram of a conventional noise reduction circuit.
Figure 2:
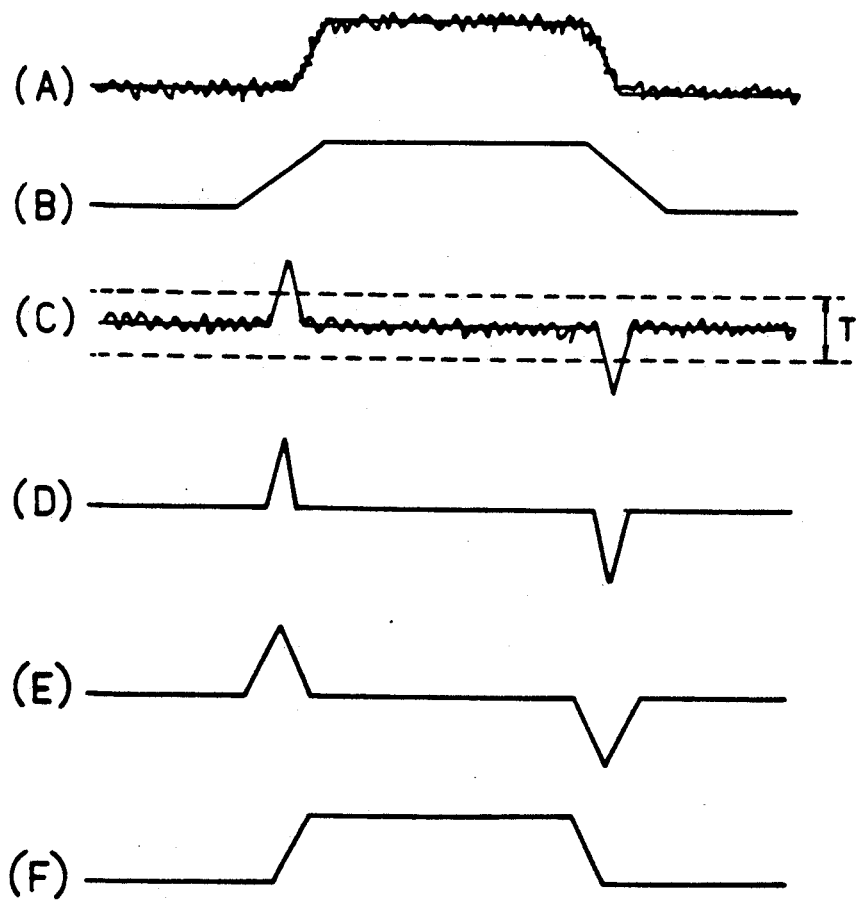
FIG. 2 including (A) to (F) is waveforms produced on main parts of the circuit shown in FIG. 1.
Figure 3:
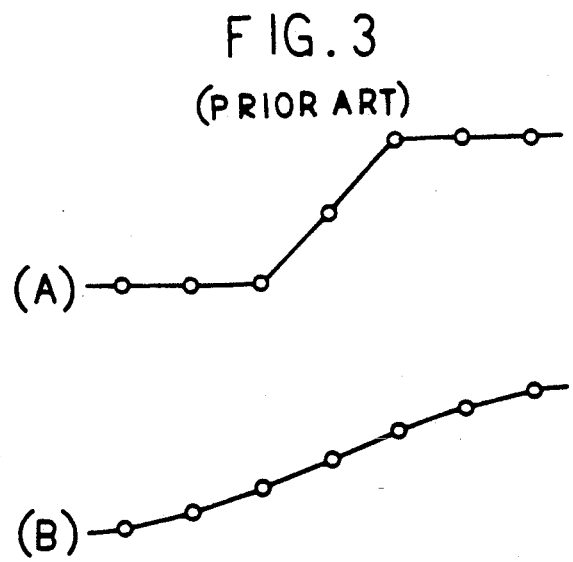
FIG. 3 including (A) and (B) is views illustrating a change of horizontal edges effected by the circuit in FIG. 1.
Figure 4:
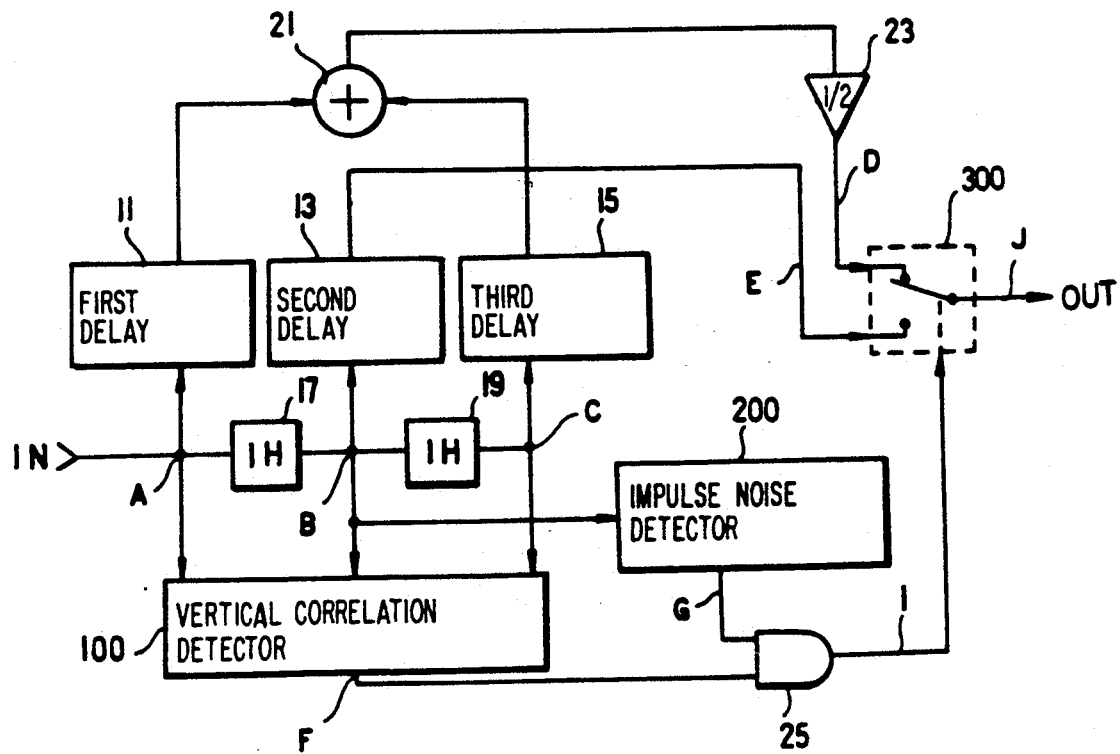
FIG. 4 is a circuit diagram of a noise reduction circuit according to the present invention.

Referring to FIG. 4, there is shown a noise reduction circuit according to the present invention, in which the noise between the upper and lower lines is determined on the basis of the vertical correlation therebetween while the noise in a horizontal directon is determined by summing (that is, integrating) the primarily differentiated values of the brightness signals. In this case, if the impulse noise is detected, it can be reduced by substituting it with the average value of the upper and lower lines.

In FIG. 4, reference numerals 17 and 19 denote line delay portions forming a delay means which delays the brightness signal inputted to an input terminal in a unit of line, respectively. Also, reference numeral 100 denotes a vertical correlation detector means which detects a vertical correlation of the brightness signals delayed by a predetermined line by way of the line delay means 17 and 19. 200 denotes an impulse noise detector means which detects the impulse noise on the basis of a vertical correlation of the 1H-delayed brightness signals by means of the line delay portion 17. Furthermore, a logic portion, generally designated 25, forms a logic means which outputs a detection signal when the vertical correlation and the impulse noise are detected by the vertical correlation detector 100 and the impulse noise detector 200, respectively. Also, first to third delay portions, generally designated 11, 13 and 15 commonly form a delay means which delays the brightness signals by a predetermined time for processing the signals. An adder 21 and a multiplier 23 form a correction signal produce means which adds and averages the brightness signals delayed by a predetermined time, and produces a corrected brightness signal.

A multiplexer, generally designated at 300, is an output means which selectively outputs the correction signal from the correction signal produce means 21 and 23 and the 1H-delayed image signal from the line delay portion 17 on the basis of the impulse noise detection signal from the logic portion 25.

Figure 5:
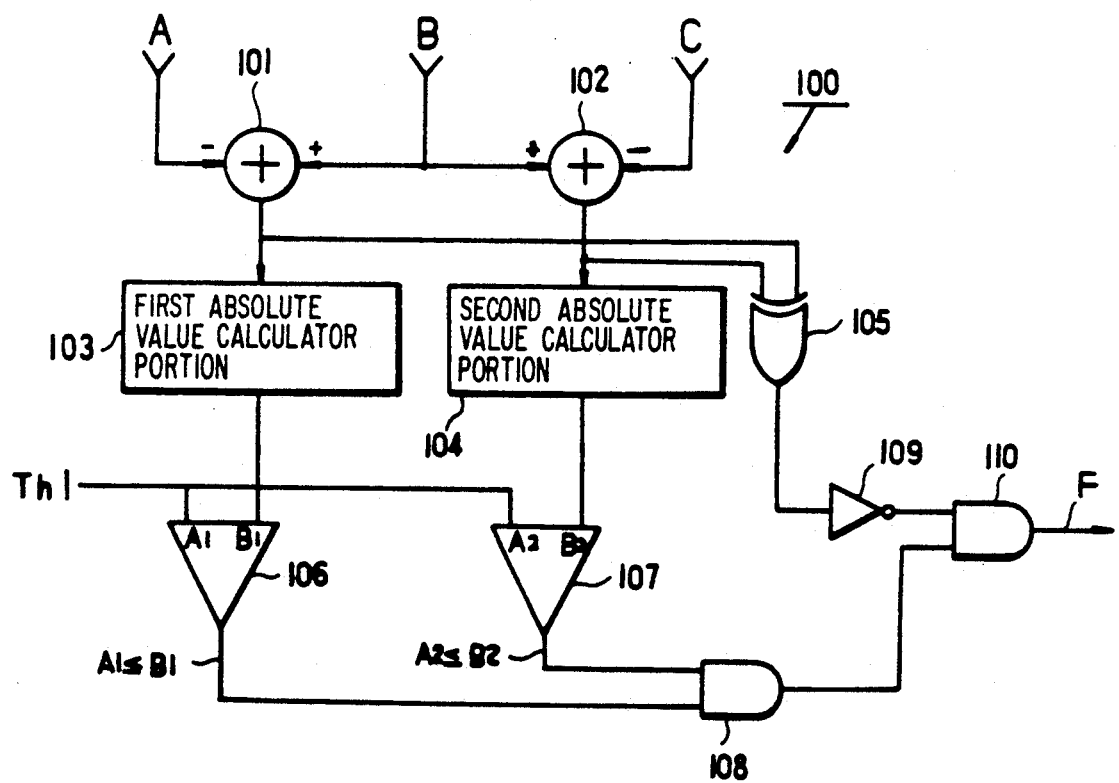
FIG. 5 is a detailed circuit diagram illustrating an embodiment of a vertical correlation detector in FIG. 4.

Referring now to FIG. 5, there is shown a detailed circuit diagram of an embodiment of the vertical correlation detector 100 in FIG. 4. In the drawing, first and second adders, generally designated at 101 and 102, form the vertical correlation detector means 100 which obtains a difference among the present input brightness signal A, 1H-delayed brightness signal B and 2H-delayed brightness signal C so as to detect the vertical correlation therebetween.

Reference numerals 103 and 104 denote an absolute value calculator portion which calculates an absolute value from the differences of the brightness signals obtained by the first and second adders 101 and 102.

Also, first and second comparators 106 and 107 and an AND 108 commonly form a vertical correlation determination means which determines a vertical correlation by performing logic comparison and product of the absolute values of the differences of the brightness signals, obtained by the first and second absolute value calculator portions 103 and 104, with a reference value Th1.

An exclusive-OR gate 105 and an inverter 109 are composed of an impulse noise determination means which performs exclusive-OR operation and inversion for the differences of the brightness signals, each being obtained by the first and second adders 101 and 102, to thereby determine whether the signal is the impulse noise or not.

In addition, an AND gate, generally designated at 110, is a vertical noise determination means which outputs a vertical noise generation signal when the signal is the impulse noise by using the correlation determination means and the impulse noise determination means.

Figure 6:
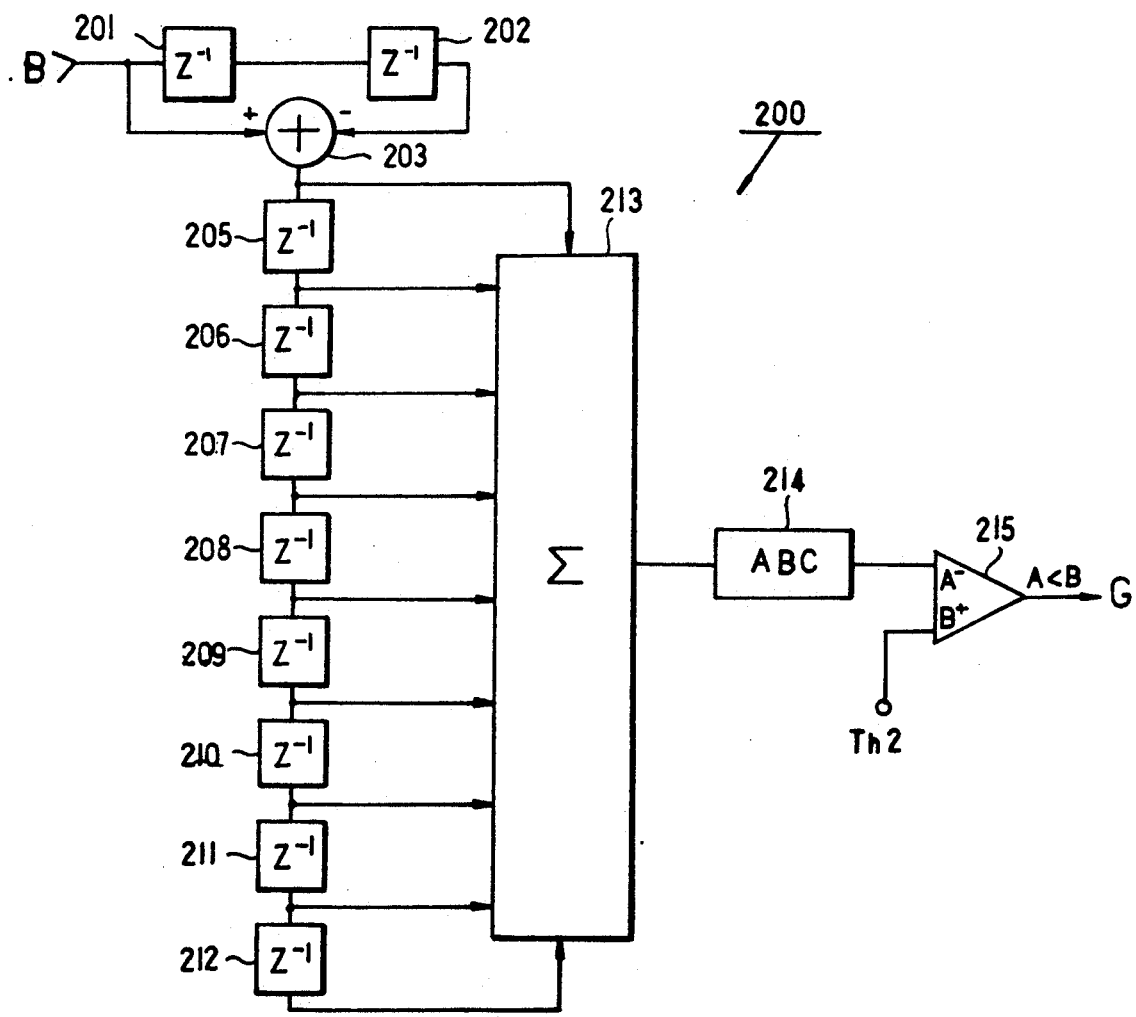
FIG. 6 is a detailed circuit diagram illustrating an embodiment of an impulse noise detector in FIG. 4.

Referring to FIG. 6, there is shown a detailed circuit diagram of an embodiment of the impulse noise detector portion 200 in FIG. 4. In the drawing, reference numerals 201 and 202 denote first and second pixel delay portions which form together with an adder generally designated at 203 a differential means for differentiating the brightness signals. Also, a plurality of pixel delay portions 205 to 212 and an summer 213 are composed of an integral means or integrator which integrates the differentiated brightness signals. An absolute value calculator 214 and a comparator 215 are composed of the noise determination means which obtains an absolute value of the brightness signals differenticated and then integrated as mentioned above, and compares the absolute value with a reference value Th2 thereby to determine whether the signal is a horizontal noise or not.

Figure 7:
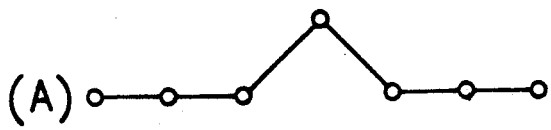
FIG. 7 including (A) and (B) is views illustrating frequency component of white impulse noise.
Figure 7:
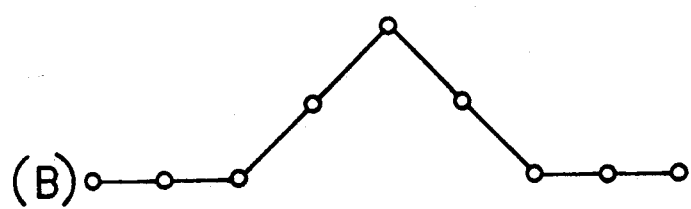
Figure 7:
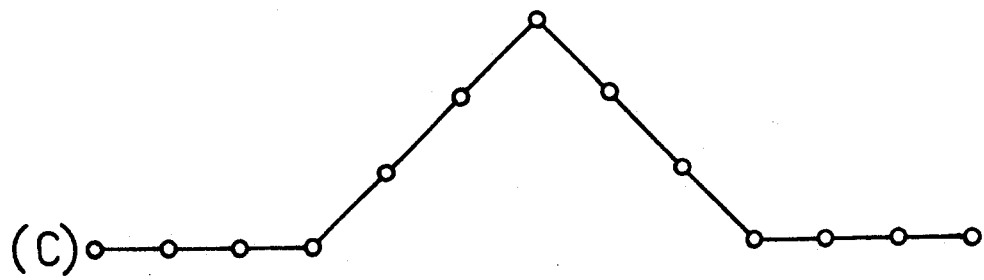

Referring to FIG. 7, there is shown views illustrating frequency components of the impulse noise(white) which has not the correlation between the upper and lower lines, but has the frequency component of 2 [MHz] or more in the horizontal direction.

Further, in FIG. 7, (A) denotes the white impulse noise having the frequency of approx. 7 [MHz], (B) denotes the white impulse noise having the frequency components of approx. 3.58 [MHz] and (C) denotes the white impulse noise having the frequency component of approx. 2.3 [HHz]. In the drawings, dots denote sampling positions of 14 [MHz], respectively.

Figure 8:
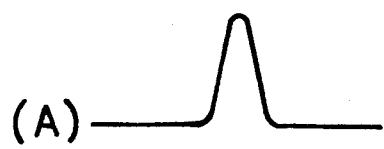
FIG. 8 including (a) to (d) is waveforms obtained by processing pulses of the transition period of the high frequency brightness signal and the noise.
Figure 8:
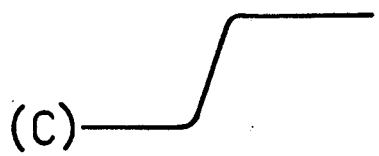
Figure 8:
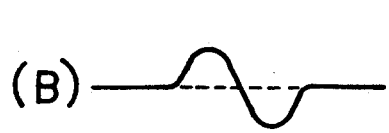
Figure 8:

Referring now to FIG. 8, there is shown waveforms obtained in processing the transition-period pulses of the high-frequency brightness signals and the noise. If the impulse noise as shown in FIG. 8 (A) is differentiated, then a sine waveform is obtained from the noise, as shown in FIG. 8 (B). Further, if the pulses of the transition period of the high-frequency brightness signals with edges changed from black to white, as shown in FIG. 8 (C) are differentiated, then the pulses are in positive pulses as shown FIG. 8 (D). Also, if the noise and the positive pulses are integrated for a predetermined time, then the noise is to be zero while the pulse is not to be zero. More particularly, when an original function is set to f(x), the primary differential function is indicated by f'(x). Then, if the primary differential function f'(x) is integrated for a predetermined time, then it is obtained the following equation. That is;

$$\int_a^b f(x) \cdot dx = \begin{cases} 0 & \text{where } f(x) \text{ is a periodic function} \\ \text{not zero} & \text{where } f(x) \text{ is not a periodic function} \end{cases}$$

Accordingly, if the integrated value is zero, it means that the value is the impulse noise. Alternatively, if the value is not zero, then it means that the value is the original brightness signal.

Figures 9, 10:
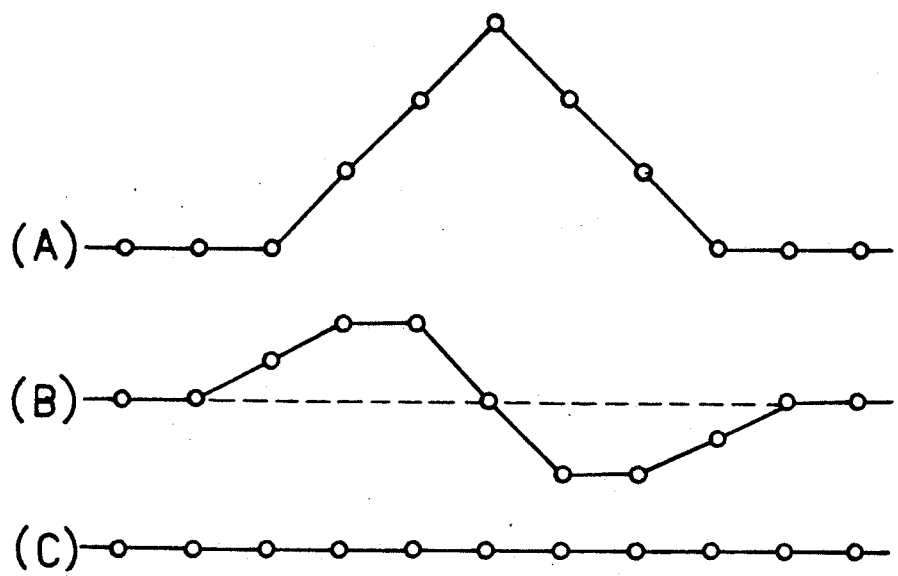
FIG. 9 including (a) to (c) is waveforms obtained by processing the white impulse noise; and, FIG. 10 is an examplary view of a size of a noise detecting window.

Next, FIG. 9 shows waveforms obtained in processing the white noise. If the differential is carried-out for the noise shown in FIG. 9 (A), then a sine waveform is obtained from the noise, as shown in FIG. 9 (B). Further, if the noise of the sine waveform is integrated again, then the linear waveform which in turn is determined as the noise is obtained as shown in FIG. 9 (C).

Referring to FIG. 10, there is shown an examplary view of a size of a noise detecting window according to the present invention. With the window in FIG. 10, the noise is detected by using, for example, 3 lines in the horizontal direction and 9 pixels in the vertical direction. In this case, as the size of the window is increased, the noise can be effectively removed.

Now, an embodiment of the noise reduction method and circuit according to the present invention will be described.

Referring to FIG. 4, if the brightness signal is entered to the input terminal IN, then the signal is dealyed by the line delay portions 17 and 19 in a unit of line. In the drawing, A, B and C denote the present input brightness signal, 1H-delayed brightness signal and 2H-delayed brightness signal, respectively. If the signals A, B and C are entered to the vertical correlation detector portion 100, the first and second adders 101 and 102 in the vertical correlation detector portion 100 add the brightness signals A and B, C and B, inputted to inverting and non-inverting terminals thereof and obtain the difference between the present input brightness signal A and the 1H-delayed brightness signal B and the difference between the 1H-delayed brightness signal and the 2H-delayed brightness signal so as to detect the vertical correlation therebetween. Consequently, the first and second absolute value calculator portions 103 and 104 calculate the absolute values of the differences of the brightness signals, obtained by the first and second adders 101 and 102 and output the absolute values to input terminals B1 and B2 of the first and second comparators 106 and 107.

The first and second comparators 106 and 107 compare the absolute values of the brightness signals from the absolute value calculator portions 103 and 104 with the reference value Th1. Denpending upon the comparison result, if the absolute value of the brightness signal is larger than the reference value Th1, the comparators 106 and 107 produce a high-level output, respectively and consequently the AND gate 108 outputs a high level signal according to the high level outputs of the comparators 106 and 107 to thereby indicate a generation of the noise.

Also, if the brightness signals A, B, and C are determined as the impulse noise such as 1, 0, 1 or 0, 1, 0, the exclusive-OR gate 105 outputs a low level signal and the inverter 107 inverts the output signal of the exclusive-OR gate 105.

As a result, the inverter 109 outputs a high level signal in case of generation of the impulse noise.

Also, if the impulse noise is determined by using the correlation determination means and the impulse noise determination means, the AND gate 110 outputs a vertical noise generation signal F.

As described above, the vertical correlation detector portion 100 obtains the difference between the upper and lower lines on the basis of the 1H-delayed brightness signal to be presently processed in view of the fact that no the noise has any correlation between the vertical upper and lower lines, and calculates the absolute value of the difference signals whereby it determines the absolute value larger than the reference value as the noise and it also determines that the noise is the impulse noise by exclusive-ORing and inverting the difference signal between the upper and lower lines.

Meanwhile, the input brightness signal is delayed by means of the 1H delay portion 17 by 1 horizontal line and the 1H-delayed brightness signal is entered to the impulse noise detector portion 200 which differentiates the 1H-delayed brightness signal B by the differential means including the first and second pixel delay portions 201 and 202 and the adder 203 as shown in FIG. 6.

Next, the brightness signal thus differentiated is subjected to the integration using the integral means composed of the pixel delay portions 205 to 212 and the summer 213.

Accordingly, when the brightness signal is differentiated and integrated sequentially as described above, if the signal is the impulse noise, the output of the summer 213 becomes zero as shown in FIG. 9. Alternatively, if the pulse of the transition period of the high-frequency brightness signal with the edge changed from black to white is subjected to processing then the summer 213 outputs not zero but a constant value.

The absolute value calculator portion 214 calculates the absolute value of the signal supplied from the summer 213 in the integral means and outputs the obtained absolute value to the comparator 215 which compares the value with the previously set reference value Th2 and outputs the horizontal noise detection signal G under the output "zero" of the absolute value calculating portion 214 according to the detect of the noise.

Herein, a reason to set the reference value Th1 into the input terminal B of the comparator 215 is to reduce an erroneous detection of the noise when the summed value at forward and backward sides of a peak noise point has an offset value out of "zero".

Accordingly, if the impulse noise is determined on the basis of the outputs F and G from the vertical correlation detector portion 100 and the impulse noise detector portion 200, then the logic portion 25 (FIG. 4) outputs the noise detection signal I, and the multiplexer 300 produces a correction signal according to the output of the impulse noise detection signal I from the logic porton 25. More particularly, in order to process the signal, the brightness signals delayed by the first to third delay portion 11, 13 and 15 are added to each other by the adder 21 and the added signals are averaged by the multiplier 23 to produce the correction signal D which in turn is supplied to the output terminal OUT.

On the contrary, if the impulse noise is not determined, the multiplexer 300 outputs the brightness signal, delayed by 1 horizontal line by means of the line delay portion 17 and also delayed by a predetermined time by means of the second delay portion 13.

As described above, according to the present invention, since the impulse noise can be removed without the damage of the original image signal it has an effect that a distinct picture image is provided.

The present invention has been described in consideration of the specified embodiment, it can be made various modifications and changes without departing from scope and spirit of the invention. In particular, the present invention has been described mainly with respect to the determination and reduction (correction) of the impulse noise of the brightness signal, but it will be applied to a color signal and it can be usally used in a combination relation with other noise reduction means. Accordingly, the present invention is not limited to the specifically described embodiment.

What is claimed is:

1. An impulse noise reduction method comprising:
   (a) a horizontal line delay step for delaying by 1 horizontal line an input brightness signal;
   (b) a vertical correlation determination step for determining impulse noise on the basis of a vertical correlation between the 1 horizontal line (1H)-delayed line at the step (a) and upper and lower horizontal lines thereof;
   (c) a noise signal detection step for detecting impulse noise from the 1H-delayed signal at the delay step (a) and outputting a noise detection signal;
   (d) a correction signal produce step for producing a correction signal by using upper and lower horizontal lines positioned above and below the impulse noise-detected line, respectively; and
   (e) an output step for outputting the correction signal produced at the correction signal produce step (d) when the impulse noise is detected at the noise signal detection step (c) and the impulse noise determined at the determination step (b).

2. An impulse noise reduction method according to claim 1, wherein said vertical correlation detection step (b) comprises the steps of;
   obtaining a difference between upper and lower lines on the basis of the 1H-delayed line and comparing the difference with a reference value to detect a correlation between the vertical lines;
   determining the impulse noise by using the difference between the upper and lower lines on the basis of the 1H-delayed line; and,
   outputting a noise detection signal when the impulse noise is determined without the correlation between the vertical lines at the step of detecting the vertical line correlation and the step of detecting the impulse noise.

3. An impulse noise reduction method according to claim 1, wherein said correction signal produce step (d) comprises the steps of:
   delaying the present input brightness signal and the 1H-delayed brightness signal by a predetermined time; and,
   obtaining an average value of the signals delayed at the step of delaying the signals and outputting the average value as a correction signal.

4. An impulse noise reduction method according to claim 1, wherein said output step (e) comprises the steps of: outputting the correction signal obtained from the average value between the upper and lower lines when the impulse noise is detected, and, otherwise, delaying the 1H-delayed original brightness signal by a predetermined time and outputting the further delayed brightness signal.

5. An impulse noise reduction method comprising:

(a) a horizontal line delay step for delaying by 1 horizontal line an input brightness signal;

(b) a vertical correlation determination step for determining impulse noise on the basis of a vertical correlation between the 1 horizontal line (1H)-delayed line at the step (a) and upper and lower horizontal lines thereof;

(c) a noise signal detection step for detecting impulse noise from the 1H-delayed signal at the delay step (a) and outputting a noise detection signal;

(d) a correction signal produce step for producing a correction signal by using upper and lower horizontal lines positioned above and below the impulse noise-detected line, respectively; and (e) an output step for outputting the correction signal produced at the correction signal produce step (d) when the impulse noise is detected at the noise signal detection step (c) and the impulse noise is determined at the determination step (b);

wherein said noise signal detection step (c) further comprises the steps of;

differentiating the 1H-delayed brightness signals;

integrating the differentiated brightness signals; and, obtaining an absolute value of the integrated brightness signals and comparing the absolute value with a reference value to output a noise detection signal when the noise is detected from the comparison result.

6. An impulse noise reduction circuit comprising;

a horizontal line delay means for delaying an input brightness signal by 1 horizontal line;

a vertical correlation detection means for detecting a vertical correlation between the 1H-delayed brightness signal from the horizontal line delay means and the brightness signals of upper and lower lines;

an impulse noise detection means for detecting a vertical correlation of the 1H-delayed brightness signal from said horizontal line delay means and detecting the impulse noise;

a logic means for outputting a noise detection signal when the impulse noise is detected without the vertical correlation by means of said vertical correlation detection means and the impulse noise detection means;

a signal delay means for delaying the brightness signal for a predetermined time to process the signal;

a correction signal produce means for adding the present input brightness signal delayed by a predetermined time by means of said signal delay means and the 2H-delayed brightness signal and averaging them to produce a corrected brightness signal; and, an outputting means for selectively outputting the correction signal produced from said correction signal produce means or the 1H-delayed brightness signal from said horizontal line delay means on the basis of the detection signal outputted from said logic means.

7. An impulse noise reduction circuit according to claim 6, wherein said vertical correlation detector means comprises a vertical correlation detector means for obtaining the difference values among the present input brightness signal, 1H-delayed brightness signal and 2H-delayed brightness signal and detecting the vertical correlation therebetween;

an absolute value calculator means for caculating the absolute values of the difference values of the brightness signals;

a vertical correlation determination means for comparing the absolute values with a reference value, performing a logic AND of the values and determining the vertical correlation therebetween;

an impulse noise determination means for performing an exclusive OR between the difference values of the birghtness signals and inverting said exclusive-ORed values to determine whether it is impulse noise a vertical noise determination means for outputting a vertical noise generation signal when impulse noise is determined by said vertical correlation determination means and impulse noise determination means.

8. An impulse noise reduction circuit according to claim 6, wherein said impulse noise detector means comprises a differential means for differentiating the brightness signal; an integral means for integrating the differentiated brightness signal; and, a noise determination means for obtaining an absolute value differential and integrated, and comparing the absolute value with a reference value to determine that it is a horizontal noise.

9. An impulse noise reduction circuit according to claim 7, wherein said vertical correlation detector means comprises first and second adders for obtaining the difference between the 1H-delayed brightness signal and the 2H-delayed brightness signal on the basis of the present input brigtness signal to detect the vertical correlation therebetween.

10. An impulse noise reduction circuit according to claim 7, wherein said vertical correlation determination means comprises first and second comparators for comparing the absolute value of the difference between the 1H-delayed brightness signal and the 2H-delayed brightness signal on the basis of the present input brightness signal with the reference value, and detecting the correlaton therebetween; and, an AND gate for outputting a vertical correlation signal according to the correlation detected by said first and second comparators.

11. An impulse noise reduction circuit according to claim 7, wherein said impulse noise determination means comprises an exclusive-OR gate for exclusivelly ORing the signal difference between the 1H-delayed brightness signal and the 2H-delayed brightness signal on the basis of the present input brightness signal; and, an inverter for inverting the output of said exclusive-OR gate and outputting an impulse noise signal.

12. An impulse noise reduction circuit according to claim 8, wherein said differential means comprises first and second pixel delay portons for delaying pixels, and an adder for obtaining the difference between the pixels delayed by said delay portions.

13. An impulse noise reduction circuit according to claim 8, wherein said integral means comprises at least three pixel delay portons for delaying pixels of the differentiated brightness signals, and a summer for summing the brightness signals delayed by said pixel delay portion.

* * * * *